United States Patent [19]

O'Hara et al.

[11] Patent Number: 6,032,686
[45] Date of Patent: *Mar. 7, 2000

[54] CARTRIDGE VALVE WITH VACUUM BREAKER

[75] Inventors: Robert P. O'Hara, Huntington Beach; Curtis S. Woolley, Carlsbad, both of Calif.

[73] Assignee: Emhart Inc., Newark, Del.

[*] Notice: This patent is subject to a terminal disclaimer.

[21] Appl. No.: 09/127,909

[22] Filed: Aug. 3, 1998

Related U.S. Application Data

[63] Continuation of application No. 08/780,815, Jan. 9, 1997, Pat. No. 5,839,464.

[51] Int. Cl.[7] ...................................................... E03C 1/10
[52] U.S. Cl. ...................... 137/218; 137/217; 137/625.17
[58] Field of Search ...................................... 137/217, 218, 137/625.17

[56] References Cited

U.S. PATENT DOCUMENTS

| | | |
|---|---|---|
| 2,282,338 | 5/1942 | Moody . |
| 2,587,960 | 3/1952 | Bletcher et al. . |
| 3,056,418 | 10/1962 | Adams et al. . |
| 3,454,032 | 7/1969 | Hinz et al. . |
| 4,326,671 | 4/1982 | Goguen ............................... 137/218 X |
| 4,369,806 | 1/1983 | Noren . |
| 4,696,322 | 9/1987 | Knapp et al. ........................... 137/218 |
| 4,805,661 | 2/1989 | Knapp et al. . |
| 4,827,538 | 5/1989 | Heimann et al. . |
| 4,951,702 | 8/1990 | Brotcke ................................... 137/218 |
| 4,969,483 | 11/1990 | Knapp . |
| 5,009,247 | 4/1991 | Oberdörfer . |
| 5,095,554 | 3/1992 | Gloor . |
| 5,213,131 | 5/1993 | Gnauert et al. . |
| 5,213,268 | 5/1993 | Gnauert et al. . |
| 5,329,957 | 7/1994 | Semchuck et al. .................... 137/218 |
| 5,361,431 | 11/1994 | Freier et al. . |
| 5,392,805 | 2/1995 | Chrysler ................................. 137/218 |
| 5,402,827 | 4/1995 | Gonzalez ............................ 137/271 X |
| 5,404,898 | 4/1995 | Stowers ................................... 137/218 |
| 5,575,424 | 11/1996 | Fleischmann . |
| 5,839,464 | 11/1998 | O'Hara et al. ......................... 137/218 |

*Primary Examiner*—Gerald A. Michalsky
*Attorney, Agent, or Firm*—Harold Weinstein

[57] ABSTRACT

A cartridge valve 116 includes a fixed disk 80 and a movable disk 118 mounted in a housing 66. A lever 46 extends through a major opening 72 axially located at one end of the valve 116. The lever 46 is attached to a coupler 130 for facilitating movement of the movable disk 118 relative to the fixed disk 80 to control the flow and temperature of water passing through the valve 116. A flexible valve 144 is attached to the coupler 130 and, in normal use of the valve 116, prevents holes 136 formed therethrough from communicating with a passage formed through the movable disk 118. Air from the environment surrounding the valve 116 can enter the major opening 72, and upon the occurrence of a negative pressure in the water supply, will flex the valve 144 to allow air to enter the supply line to negate the undesirable effects thereof. In another cartridge valve 160, holes 166 are formed through the side wall of the housing 66 to provide further air communication through the holes 136 of the coupler 130. In still another cartridge valve 168, the lever 46 occupies the major opening 72 to the extent that there is no effective communication between the major opening and the holes 136 formed in the coupler 130. In this instance, the holes 166 formed in the side wall of the housing 66 provide the communication between the holes 136 of the coupler 130 and the environment surrounding the valve 116.

12 Claims, 12 Drawing Sheets

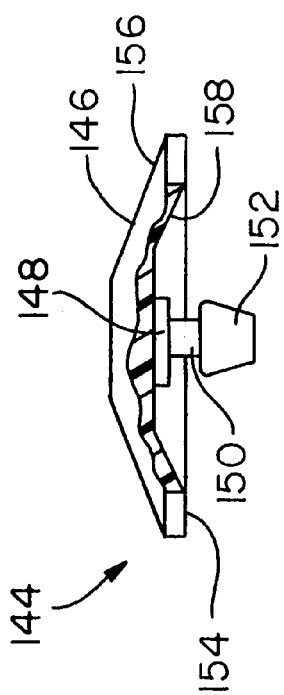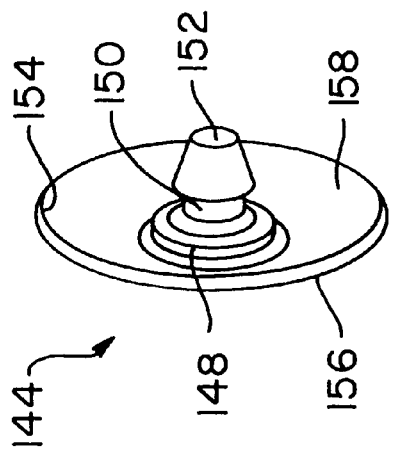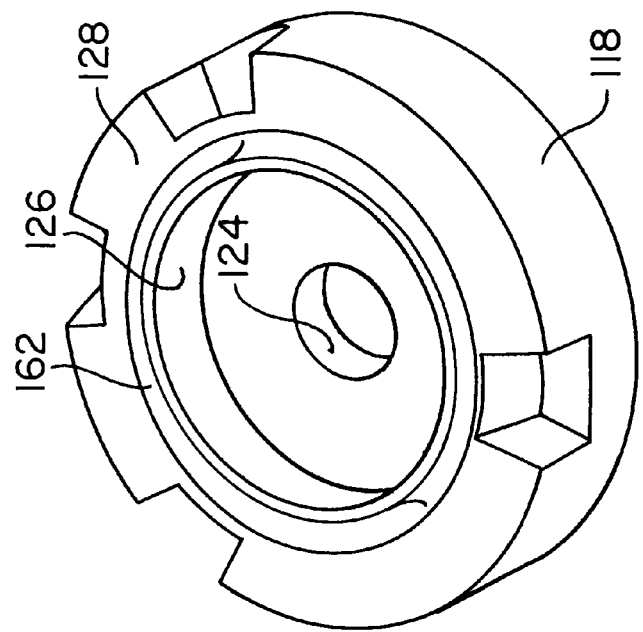

CARTRIDGE VALVE WITH VACUUM BREAKER

This application is a continuation of application No. 08/780,815, filed on Jan. 9, 1997, now U.S. Pat. No. 5,839,464.

BACKGROUND OF THE INVENTION

This invention relates to a cartridge valve with a vacuum breaker, and particularly relates to a cartridge valve for use in a faucet wherein the valve contains therein an integral atmospheric vacuum breaker.

In one type of water-flow control valve, a pair of generally flat, hard plates or disks, composed of, for example, ceramic, are placed compactly within a shell or housing with other components to form a cartridge valve. Each of the hard disks is formed with a highly polished surface which is placed in interfacing engagement with the polished surface of the other disk. One of the hard disks is movable within the housing and relative to the other disk which is fixed within the housing. A lever of the cartridge valve has portions which extend outward from the housing and portions which extend into the housing. Movement of the external portions of the lever facilitates rotary and translatory movement of the movable disk relative to the fixed disk within the housing.

Typically, a hot-water inlet conduit and a cold-water inlet conduit are attached to the cartridge housing for selectively supplying hot and/or cold water thereto. The hot and/or cold water is supplied through inlet holes formed through the fixed disk and into a mixing chamber or opening which is formed in the polished surface of the movable disk. The fixed disk is formed with an outlet hole which extends through the fixed disk for selective positioning with the mixing chamber to facilitate directing of the water, for example, from the chamber to a spout or spray head of a faucet unit, of which the cartridge valve is a part.

Historically, the cartridge valve has been designed so that the opening of the mixing chamber does not extend through the movable disk but is open selectively to the polished surface and the inlet and outlet holes of the fixed disk only. The highly polished surfaces of the movable and fixed disks provide a watertight seal which confines the water passage to the inlet and outlet openings of the fixed disks and the mixing chamber of the movable disk.

Cartridge valves of the type described above are typically compact with the components thereof being stacked and confined closely within the housing. Over the many years since the introduction of such cartridge valves, modifications have been made to the individual components of the valves. However, because of the compact nature of the cartridge valves, and the limited available space in the faucets into which such valves are typically mounted, few modifications have been made to the movable and fixed disks. Historically then, the fixed disk has been formed with through holes and the movable disk has been formed with an opening which does not extend through the disk, as described above.

When faucet units include a spray head, either independently of the spout or from within the spout, water can be selectively directed to the spout or the spray head. Frequently, the spray head is used in the kitchen of a house when washing items, such as dishes, pots, pans, cutlery and the like. The items to be washed are placed into a sink into which water and soap are deposited and the items are washed by hand. The spray head is typically used to rinse the soapy water, from the washed item, into the sink. Eventually, the water in the sink becomes dirty from the food residue being washed from the dishes.

During the period of using the spray head to rinse the items being washed, the person washing the items frequently will place the spray head, in the operating condition, into the dirty water whereby clean water exits from the spray head into the water in the sink.

It is possible that a sudden pressure drop, sometimes referred to as a "negative pressure," may occur in the pressure of the water being supplied to the valve. In this instance, the relative pressure levels between the dirty water in the sink and the incoming clean water reverses significantly to the extent that the dirty water is drawn, or syphoned, into the spray head. A drop in pressure of this nature could occur, for example, because of a break in a nearby water main, or by firemen drawing water from a local fire hydrant to extinguish a fire. With this reversal of water flow, the dirty water is drawn into the spray head, through the valve, into the inlet conduits and mixed with the potable water within the house which could reappear when other faucets within the house are used.

To preclude the occurrence of the reverse water flow, systems were developed some years ago which introduce atmospheric pressure into the inlet conduits to neutralize the effects of the negative pressure and to effectively "break" the vacuum. Typically, these systems are referred to as vacuum breakers. An early example of a vacuum breaker is disclosed in U.S. Pat. No. 3,056,418, which issued on Oct. 2, 1962. The valve shown in U.S. Pat. No. 3,056,418 is commonly referred to as a "ball valve" which is movable within a valve chamber formed in a valve body. With selective movement of the ball valve, incoming hot and/or cold water is directed into a mixing chamber, defined by the hollow interior of the ball valve, and then into an outlet line. The vacuum breaker, as described in U.S. Pat. No. 3,056,418, includes a bore is formed in the valve body, below the ball valve, and contains a floating ball which reacts to the development of negative pressure in the water supply line. This allows air at atmospheric pressure to be introduced through the bore into the inlet lines to negate the effects of the negative pressure.

More recently, as disclosed in U.S. Pat. No. 4,805,661, which issued on Feb. 21, 1989, a ball valve of the type disclosed in U.S. Pat. No. 3,056,418 was modified to include a flap valve within the hollow interior of the ball valve to function as a vacuum breaker. In this context, the vacuum breaker is located within the normally hollow interior of the valve rather than being formed in the valve housing below the ball valve.

In the past, attempts have been made to provide a vacuum breaker with valves of the cartridge type described above. As noted above, a cartridge valve of this type includes two interfacing generally flat, hard disks located compactly within a housing with other compactly located components of the valve. Because of the compact assembly of the components within the housing of a cartridge valve, there appears to be no opportunity for including a vacuum breaker within the cartridge valve. Several embodiments of a vacuum breaker used in conjunction with a cartridge valve are described in U.S. Pat. No. 4,969,483, which issued on Nov. 13, 1990. In each of the embodiments, an elastic body functions in the manner of a one-way valve to provide an anti-syphon device. However, in each embodiment, the elastic body is located outside of the cartridge valve with the components of the valve remaining in an unmodified compact arrangement within the housing of the cartridge.

Another recently developed vacuum breaker system, for use with a cartridge valve, is described in U.S. Pat. No. 5,329,957, which issued on Jul. 19 1994, and which is assigned to the assignee of this application. In the vacuum breaker of U.S. Pat. No. 5,329,957, a manifold and a module having an umbrella valve assembled therewith are assembled below the cartridge. The umbrella valve responds to the development of a negative pressure and functions to neutralize the effects thereof. Again, the responsive elements are located outside of the cartridge valve, with the components of the valve remaining in an unmodified compact arrangement within the housing of the cartridge.

As noted above, vacuum breakers were designed many years ago for use with valves of faucet systems and, more recently, for use with cartridge valves. However, such vacuum breakers have been external of the cartridge valves, thereby requiring additional space in the overall valve assembly. Consequently, there is a need for a cartridge valve which includes a vacuum breaker located compactly within the housing of the cartridge valve.

SUMMARY OF THE INVENTION

It is, therefore, an object of this invention to provide a cartridge valve having a vacuum breaker arranged compactly within the cartridge valve with the remaining components of the valve.

Another object of this invention is to provide a cartridge valve with a vacuum breaker which facilitates the easy and efficient assembly of the components thereof.

Still another object of this invention is to provide a cartridge valve with a vacuum breaker which can be easily assembled and disassembled with respect to other facilities of a valve assembly of which the cartridge valve is a part.

A further object of this invention is to provide a cartridge valve with a vacuum breaker wherein a working element of the vacuum breaker can be easily replaced.

With these and other objects in mind, this invention contemplates a cartridge valve which includes a housing containing a first disk which is fixed within the housing and a second disk which is movable within the housing and relative to the first disk. The second disk is formed with a passage therethrough which is positionable in communication with an opening formed through the first disk upon selective movement of the second disk. A valve holder positioned adjacent the second disk has at least one hole formed therethrough for communication with the passage of the second disk. A flexible valve attached to the valve holder blocks communication between the hole of the valve holder and the passage of the second disk when the pressure of a medium in the passage is greater than the pressure of a medium in the hole and for allowing communication therebetween when the pressure in the passage is less than the pressure in the hole.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 14 is a perspective view showing a second major surface of the movable hard disk of FIG. 13 in accordance with certain principles of the invention;

FIG. 15 is a side view with portions broken away showing an umbrella valve of the cartridge valve of FIGS. 5, 6 and 7 in accordance with certain principles of the invention; and FIG. 16 is a perspective view showing the umbrella valve of FIG. 15.

DETAILED DESCRIPTION OF THE PREFERRED EMBODIMENTS

Figure 1:
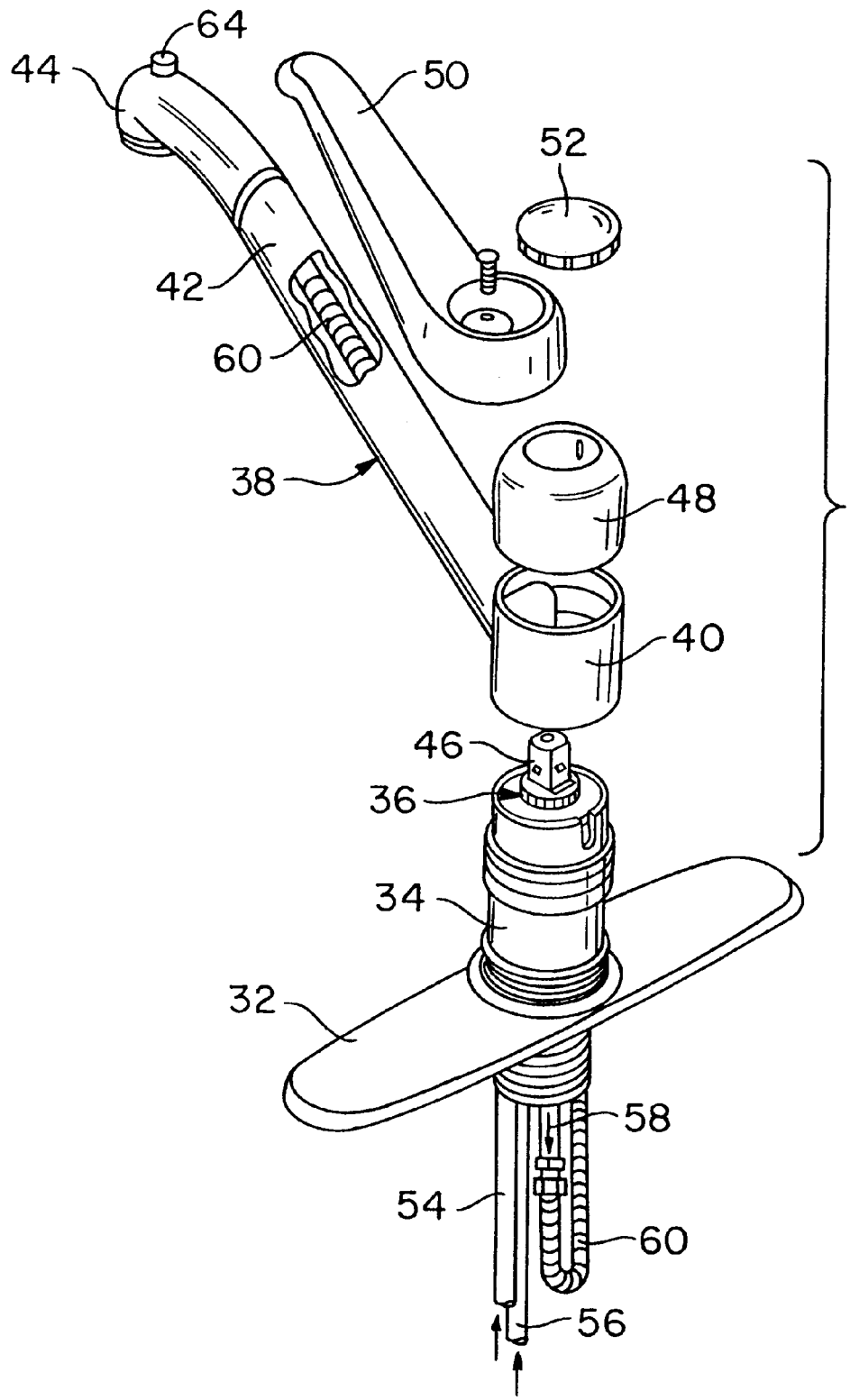
FIG. 1 is an exploded perspective view showing a faucet having a cartridge valve and a spray head mounted in and removable from a spout shell.

Referring to FIG. 1, a single-control kitchen faucet 30 includes a base 32, a casing 34 and a cartridge valve 36 located within a top opening of the casing. The faucet 30 further includes a spout assembly 38 formed by a hub shell 40 and a spout shell 42 with a spray head 44 at the free end of the spout shell. The hub shell 40 is positionable over the casing 40 such that a lever 46 of the cartridge valve 36 extends through a top opening of the hub shell. A decorative cap 48 is positionable onto the hub shell 40 with the lever 46 extending therethrough. An operating handle 50 is threadedly attached to the top of the lever 46 and a decorative dome 52 is placed on the handle to complete the exterior of the faucet 30.

A hot water inlet conduit 54 and a cold water inlet conduit 56 extend into the faucet 30 at the bottom of the casing 34 and an outlet conduit 58 extends also from the bottom of the casing. A flexible conduit 60 is coupled to the outlet conduit 58 and extends through the casing 34, through an opening 62 between the hub shell 40 and the spout shell 42, through the spout shell and is coupled to the spray head 44.

The faucet 30 can be used in a normal spout configuration, as illustrated, with the spray head 44 remaining in the spout shell 42 and the handle 50 used to control the flow and temperature of the water supplied through the faucet. In a spray mode, the spray head 44 is removed from its assembly with the spout shell 42 whereby the flexible conduit 60 allows the spray head to be withdrawn from the spout shell and moved about by a user. To operate the spray head 44, a button 64 on top of the spray head is depressed and the handle 50 is adjusted for water flow and temperature control. The portion of the flexible conduit 60 which is coupled to the outlet conduit 58 is provided with sufficient slack to allow the user to withdraw the spray head 44 from the spout shell 42 for a limited but fully useful distance.

Figure 2:
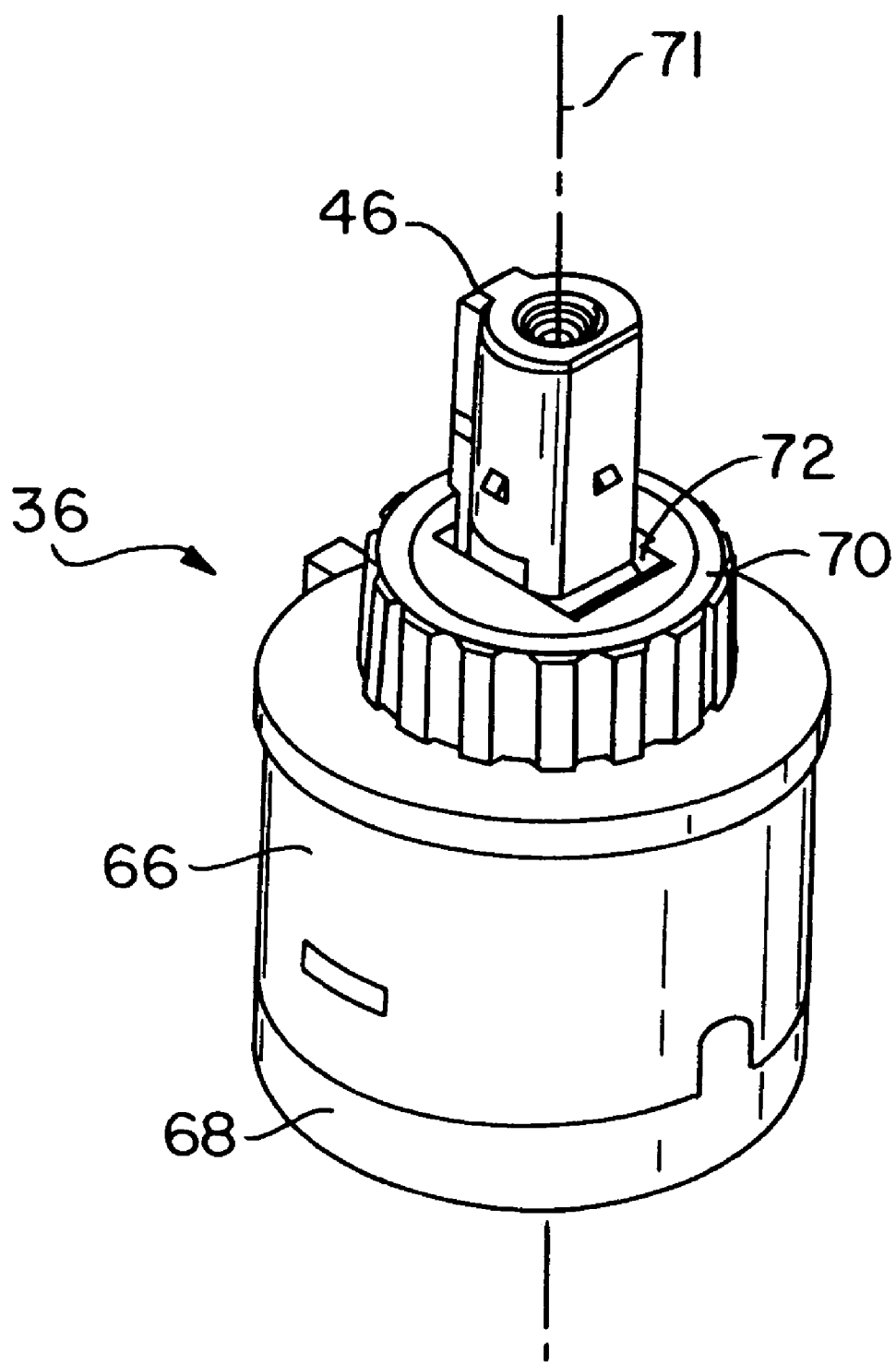
FIG. 2 is a perspective view showing a conventional cartridge valve.
Figure 3:
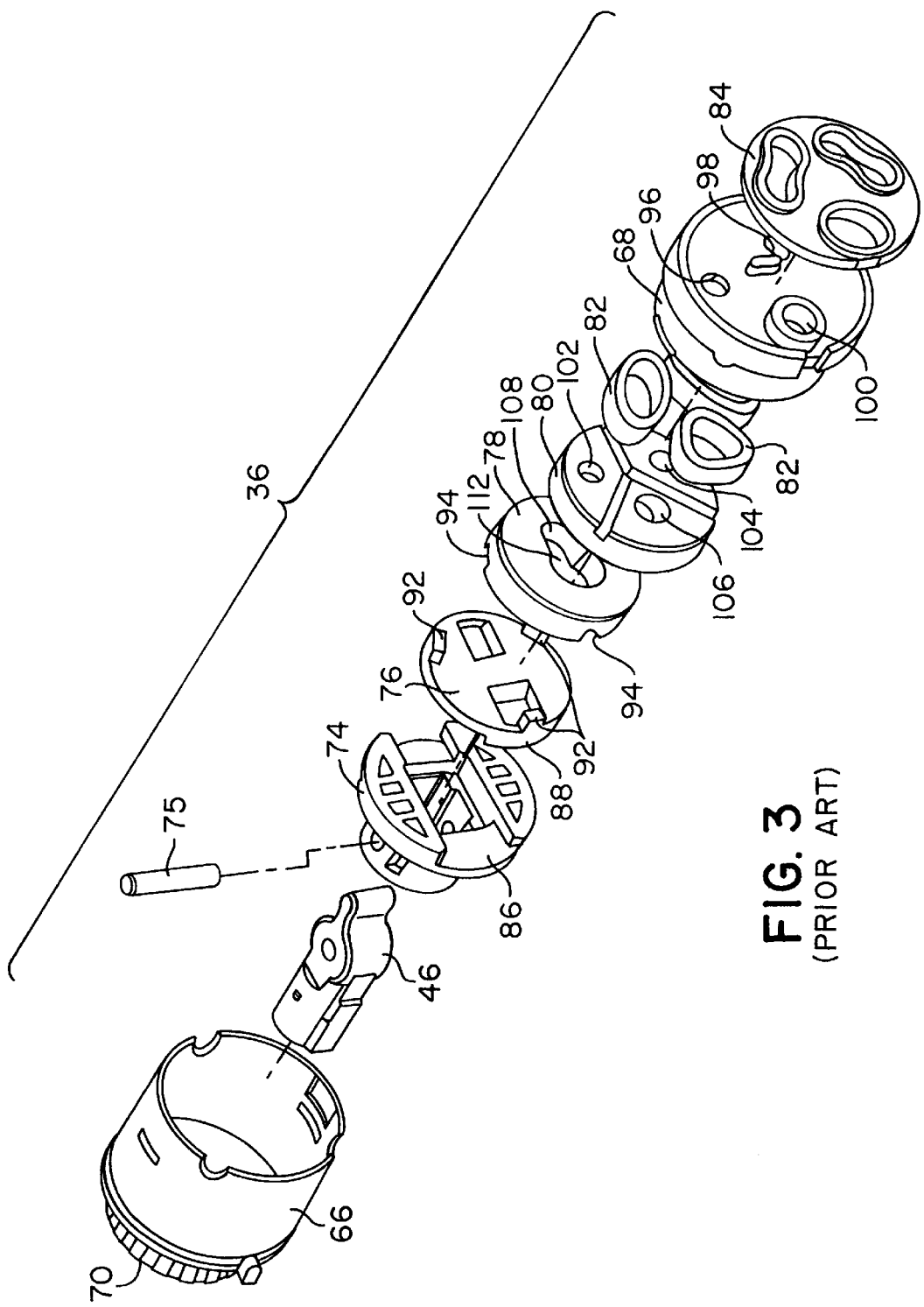
FIG. 3 is an exploded perspective view showing components of the cartridge valve of FIG. 2.

As shown in FIG. 2, the cartridge valve 36 includes a cylindrical housing 66 with a base 68, a reduced cap-like top 70 aligned about an axis 71. A bushing 74 is located within the housing 66 and is formed with an opening 72 therethough, through which the lever 46 extends. The opening 72 forms a major opening of the cartridge valve 36 in an axial direction of the cylindrical housing 66. Referring to FIG. 3, the cartridge valve 36 further includes the bushing 74, a pin 75, a coupler 76, a movable, generally flat disk 78 and a fixed, generally flat disk 80. The movable disk 78 and the fixed disk 80 are each composed of a hard material such as, for example, ceramic. The cartridge valve 36 also includes three resilient seals 82 within the valve and a gasket 84 at the outer bottom portion of the base 68.

The cartridge valve 36 is fully described in U.S. Pat. No. 5,402,827, which is incorporated herein by reference thereto. U.S. Pat. No. 5,402,827 issued on Apr. 4, 1995, and is assigned to the assignee of this application.

Figure 4:
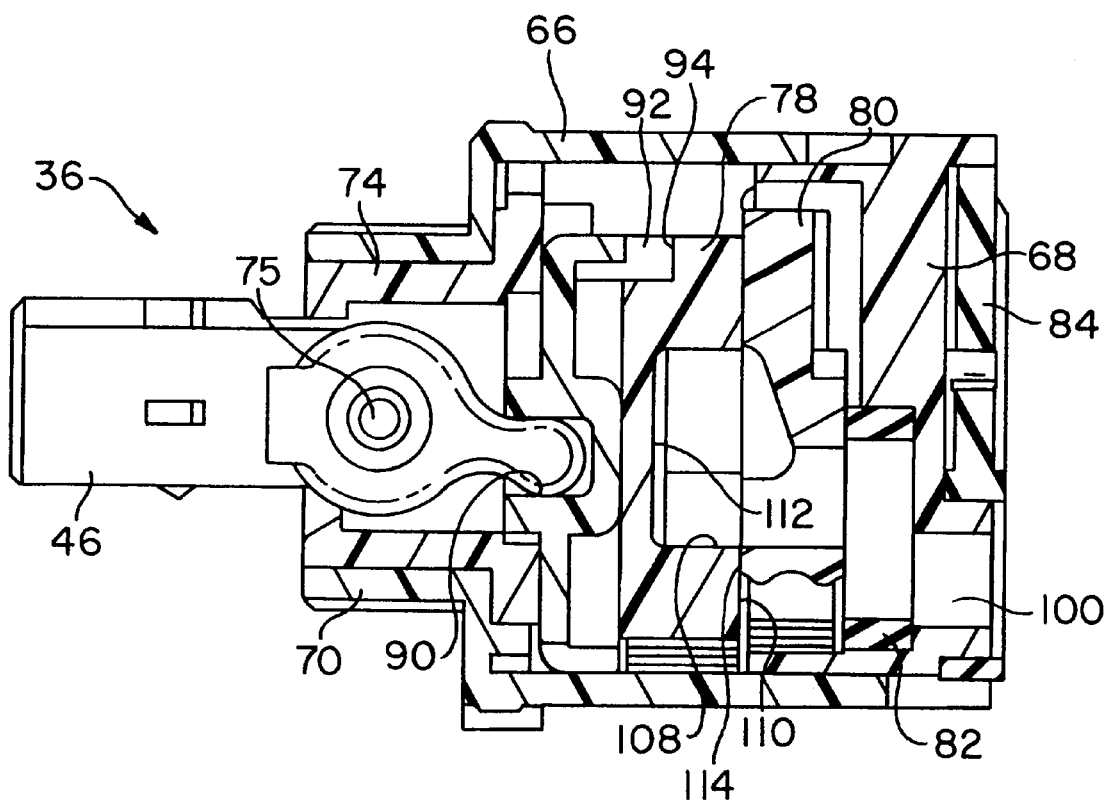
FIG. 4 is a sectional view showing the assembled arrangement of the components of the cartridge valve of FIGS. 2 and 3.

Referring to FIGS. 3 and 4, the lever 46 is attached for pivoting movement to the bushing 74 by the pin 75. The bushing 74 is formed with a wide slot 86 which receives a projection 88 extending from the coupler 76. The projection 88 is formed with an opening 90 (FIG. 4) which receives the inboard end of the lever 46. With this arrangement, the lever 46 can be rotated about its axis to rotate the bushing 74 and, in turn, the coupler 76. In addition, the lever 46 can be pivoted about the axis of the pin 75 to provide translatory or lateral movement of the coupler 76. Thus, the coupler 76 can be rotated and moved laterally through control of the outboard end of the lever 46.

The coupler 76 is formed with a plurality of lugs 92 which nest in a corresponding plurality of notches 94 formed in the movable disk 78 so that any rotational and lateral motion of the coupler is coupled to the movable disk. The fixed disk 80 is attached to the housing 66 to preclude any relative movement therebetween. The seals 82 are located within the housing 66 between the fixed disk 80 and the base 68.

As shown in FIG. 3, the base 68 is formed with two inlet openings or holes 96 and 98 and an outlet hole 100 which are aligned with two inlet holes 102 and 104 and an outlet opening or hole 106, respectively, which are formed through the fixed disk 80. A key-hole shaped opening 108 is formed in a first surface 110 of the movable disk 78, the opening being formed with a floor 112 such that the opening 108 does not extend through the movable disk. The fixed disk 80 is formed with a second surface 114 (FIG. 4) which is in interfacing engagement with the first surface 110 of the movable disk 78. The surfaces 110 and 114 are highly polished to provide a water-tight seal as the movable hard disk 78 is moved relative to the fixed hard disk 80.

The movable disk 78 can be positioned so that portions of the first surface 110 cover the inlet holes 102 and 104 of the fixed disk 80 to preclude the supply of water to the spray head 44 in either the spout mode or the spray mode. The movable disk 78 can also be moved to align portions of the opening 108 thereof with one or both of the inlet holes 102 and 104 of the fixed disk 80 to allow hot and/or cold water to flow into the opening 108, and then through the outlet hole 106 to the spray head 44. In this arrangement, the opening 108 of the movable disk 78 functions as a mixing chamber where the hot and cold water are mixed. The amount of hot and cold water supplied to the mixing chamber, for temperature satisfaction, is controlled by the proportions of the holes 102 and 104 which are covered, or uncovered, when the movable disk 78 is selectively positioned by movement of the lever 46.

As can be readily seen in FIG. 4, the components of the cartridge valve 36 are compactly and tightly mounted and contained within the housing 66, with essentially no space for additional elements to be assembled therein.

As described above in the Backgorund of the Invention, if the spray head 44 is in the spray mode and is inserted into dirty water, the dirty water could be siphoned into the spray head and ultimately into the potable supply in the event a drop in pressure of the supplied water occurs. Typically, to prevent the siphoning of the dirty water, a vacuum breaker is installed in the faucet in various ways as described above in the Background of the Invention. However, with respect to the cartridge valve 36, the compactness of the components within the valve heretofore has not accommodated the placement of a vacuum breaker within the valve. As noted above with respect to U.S. Pat. Nos. 4,969,483 and 5,329,957, vacuum breakers were developed for use with cartridge valves similar generally to the cartridge valve 36. However, in each of these patents, the vacuum breaker facility was placed outside of the cartridge valve.

Figure 5:
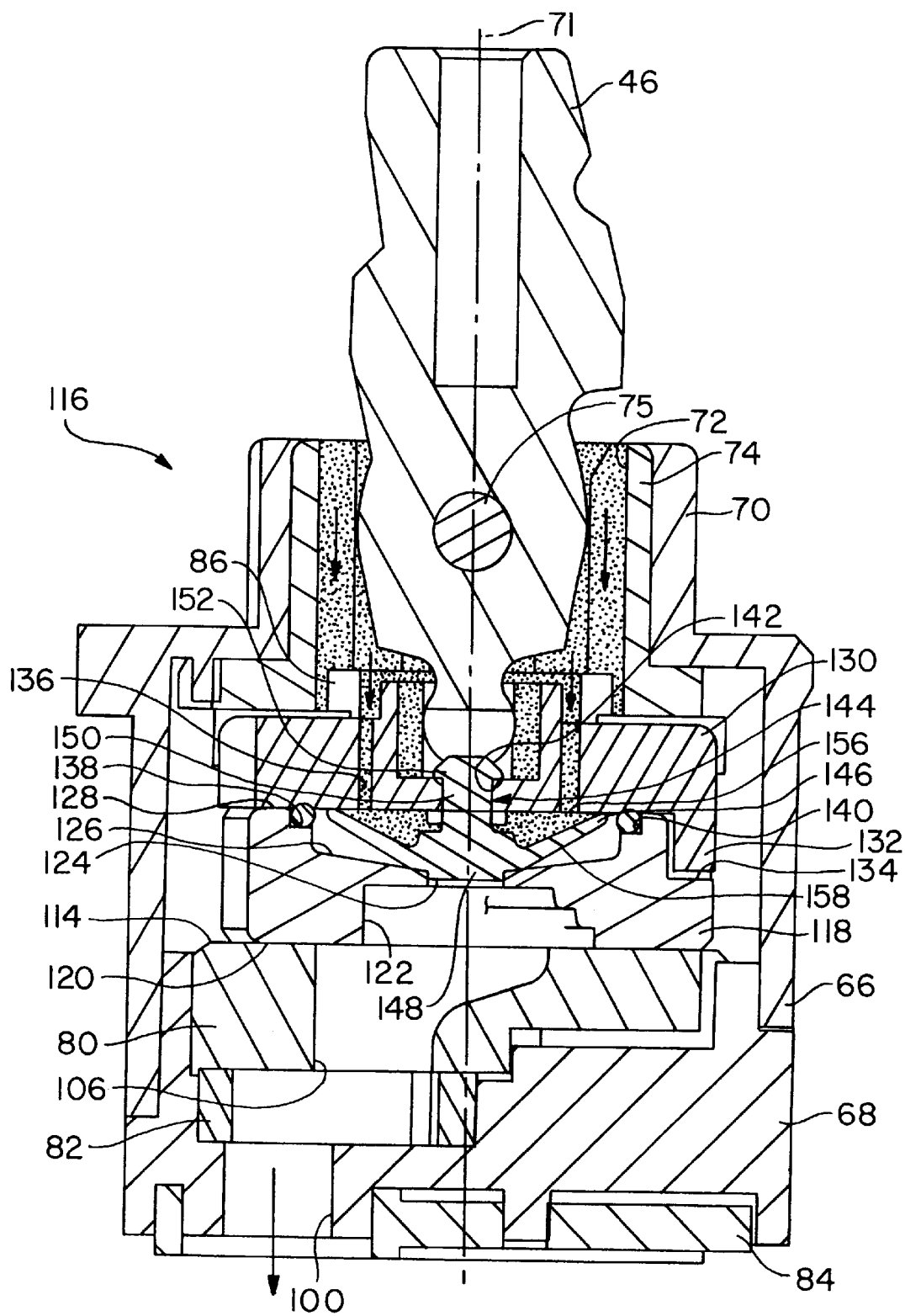
FIG. 5 is a sectional view showing an assembly of components of a first embodiment of a cartridge valve in accordance with certain principles of the invention.
Figure 6:
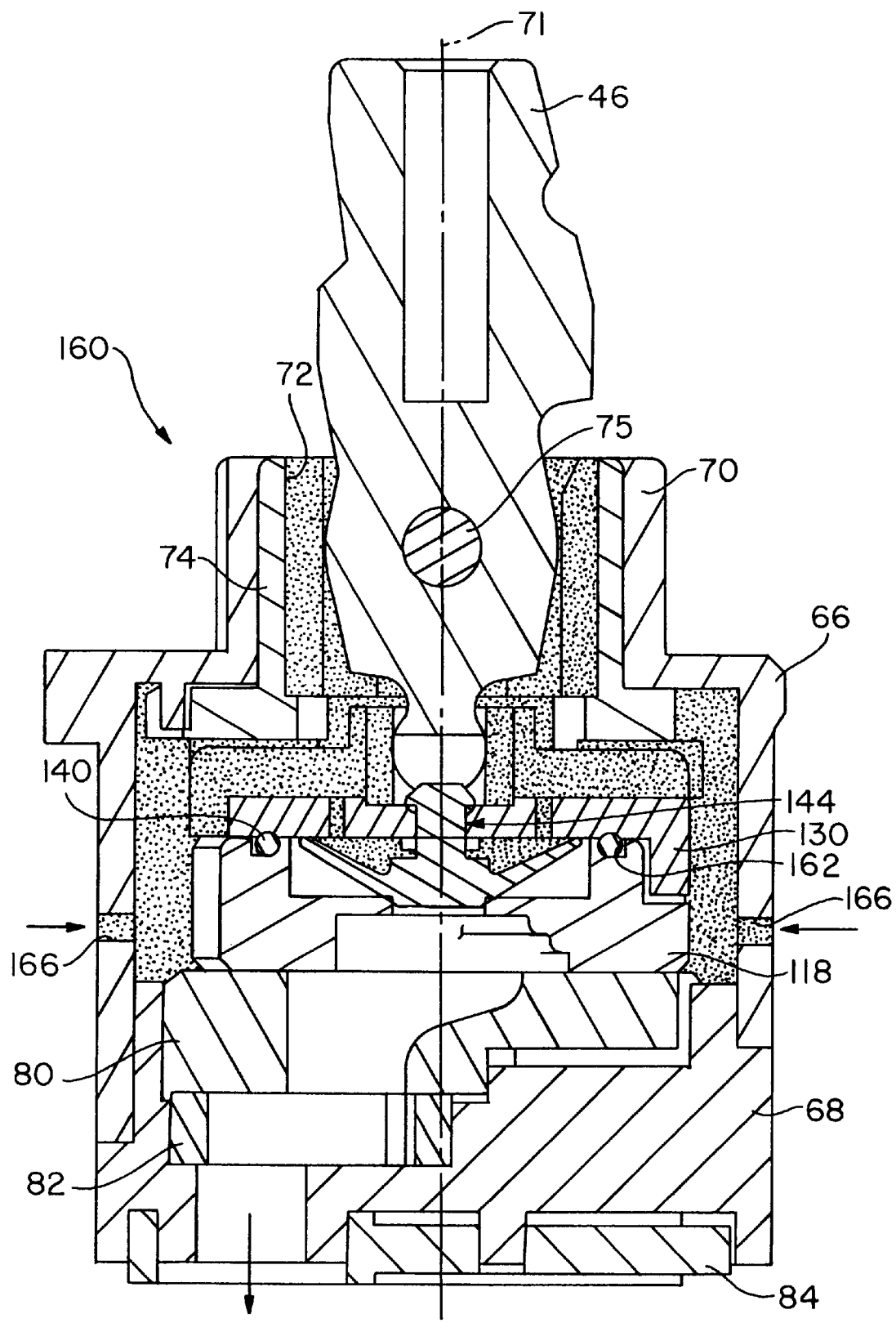
FIG. 6 is a sectional view showing an assembly of components of a second embodiment of a cartridge valve in accordance with certain principles of the invention.
Figure 7:
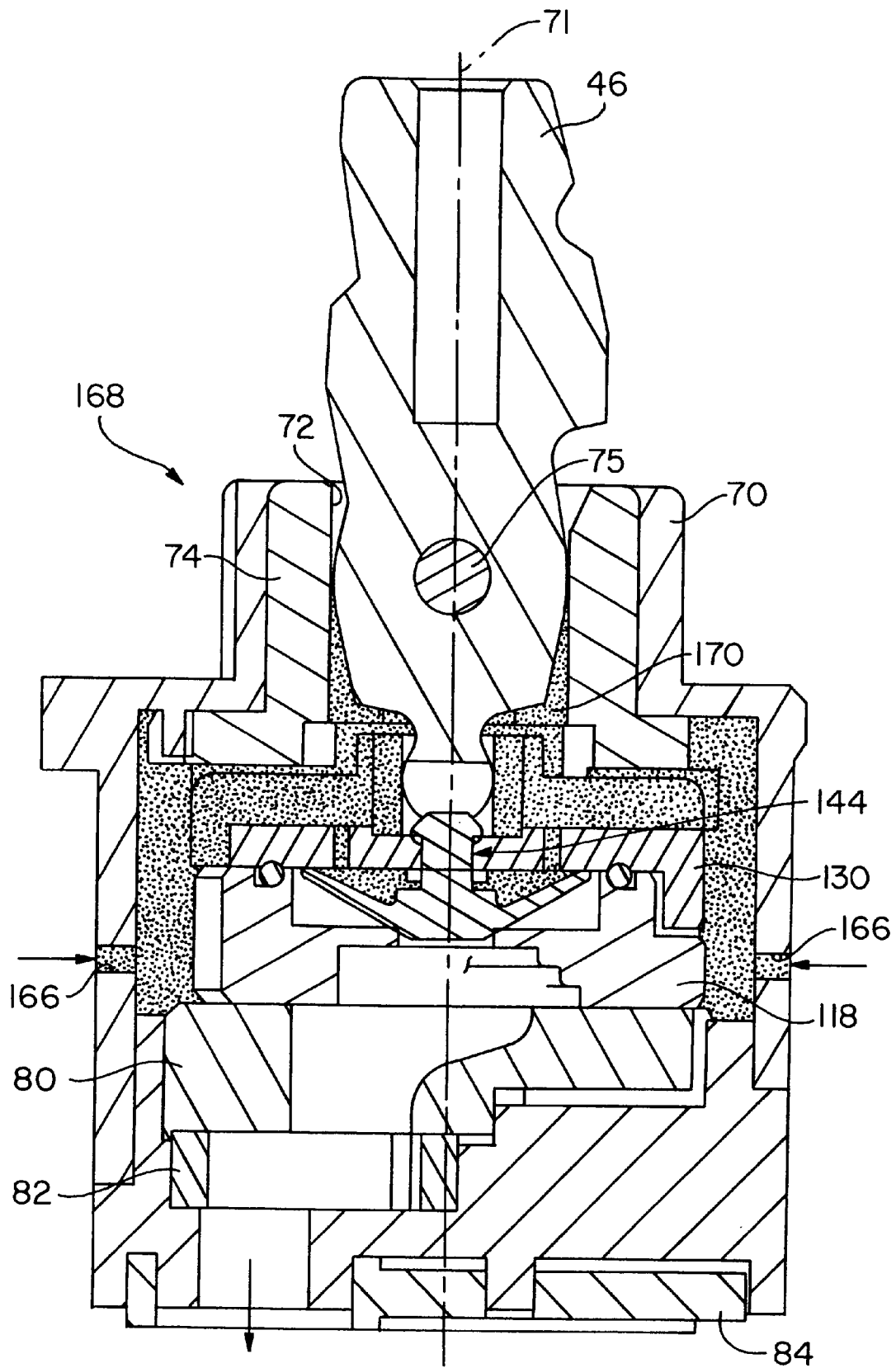
FIG. 7 is a sectional view showing an assembly of components of a third embodiment of a cartridge valve in accordance with certain principles of the invention.
Figure 8:
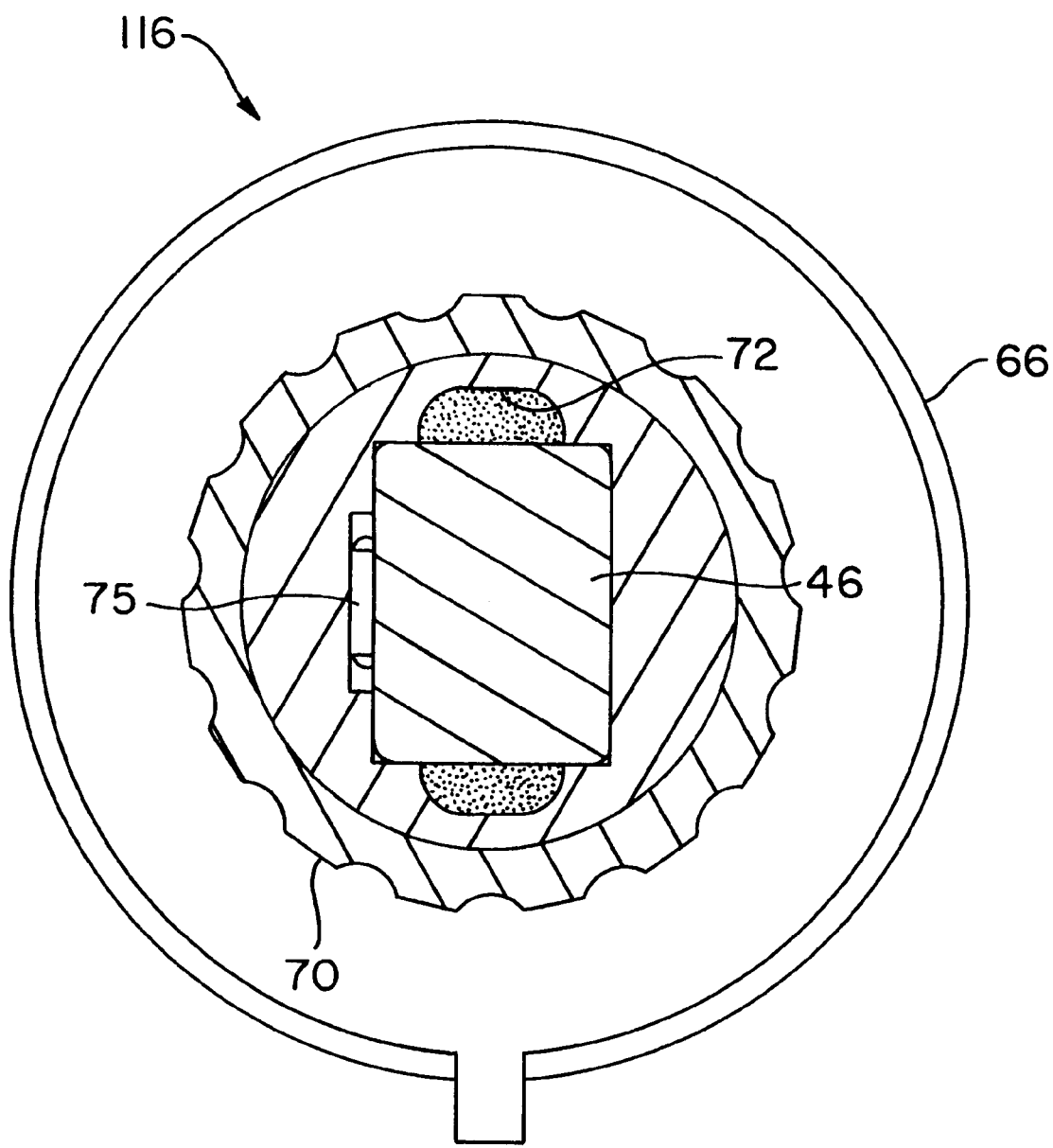
FIG. 8 is a sectional view showing a portion of the cartridge valve of FIGS. 5 and 6.

As disclosed in FIGS. 5, 6 and 7, three embodiments of a cartridge valve have been developed to include a vacuum breaker within the valve. This provides facility for the ready and easy removal of the cartridge valve, including the vacuum breaker, if need be, for servicing or replacement. There is no need to relate separately with the removal of the vacuum breaker independently of the removal of the cartridge valve.

In the following description, some of the components of the three newly developed embodiments of the cartridge valve are functionally, if not physically, similar to the components of the above-described cartridge valve 36. In such instances, the same identification numerals for the components of the cartridge valve 36, as used above, will be used in following description and drawings relating to the three newly developed embodiments. In some instances, different numerals will be used.

Referring to FIG. 5, a cartridge valve 116 forms a first embodiment of a cartridge valve with an integral vacuum breaker. The cartridge valve 116 includes a movable disk 118 having a highly polished, first major surface 120 which is in interfacing engagement with the highly polished surface 114 of the fixed disk 80. An opening 122 is formed in the surface 120 of the movable disk 118 and communicates with a central opening 124 formed therein which, in turn, communicates with an opening 126 formed in a second major surface 128 of the movable disk. The openings 124 and 126 form a passage which combine with the opening 122 to provide a continuous opening or passage through the movable disk 118.

Figure 11:
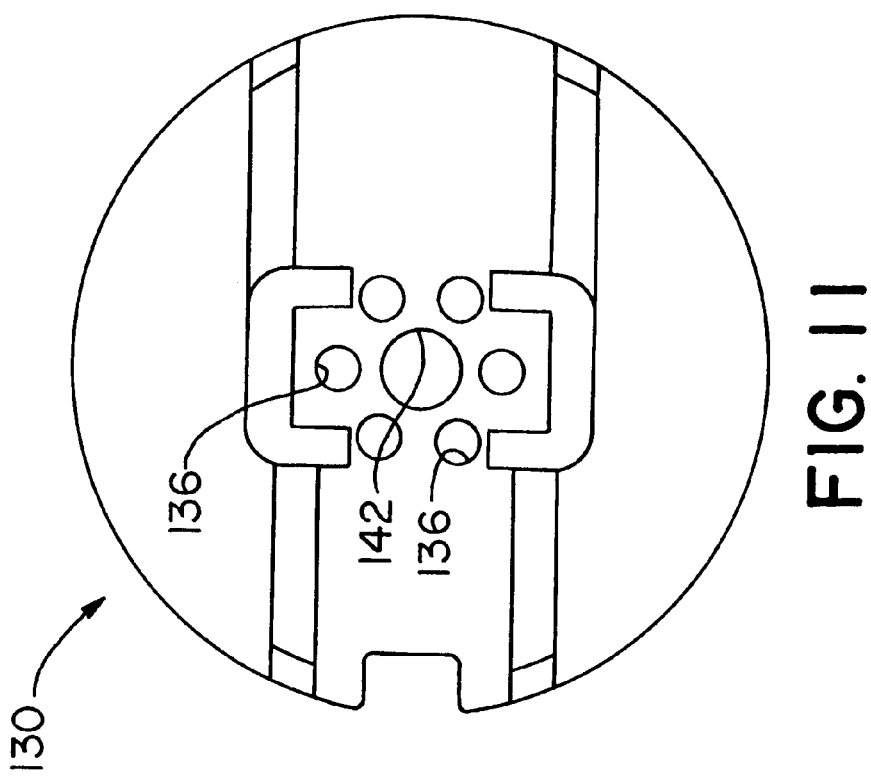
FIG. 11 is a top view showing a first major surface of the coupler of FIG. 10 in accordance with certain principles of the invention.
Figure 10:
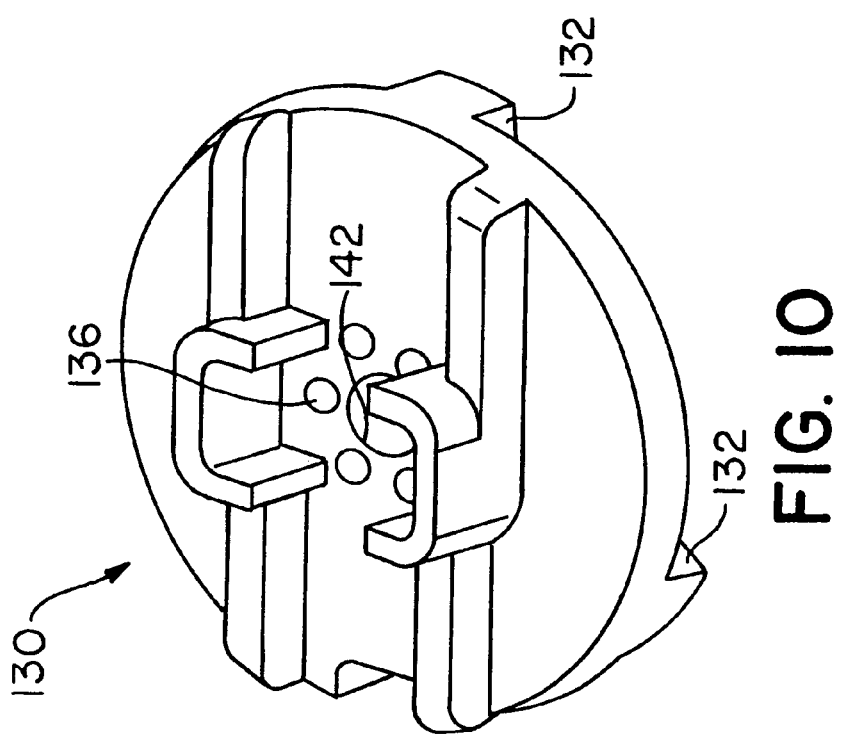
FIG. 10 is a perspective view showing a coupler of the cartridge valve of FIGS. 5, 6 and 7 in accordance with certain principles of the invention.
Figure 13:
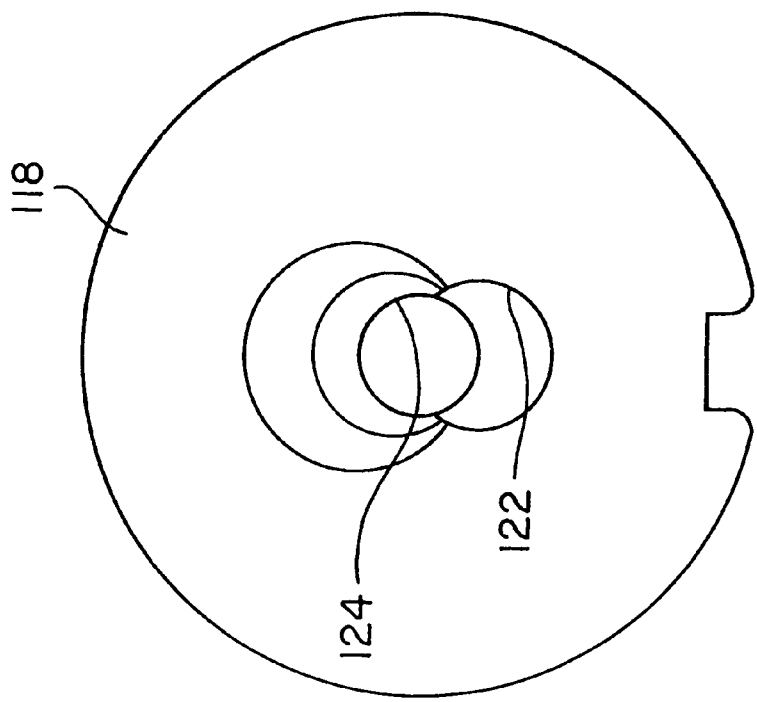
FIG. 13 is a bottom view showing a first major surface of a movable hard disk of the cartridge valve of FIGS. 5, 6 and 7 in accordance with certain principles of the invention.
Figure 12:
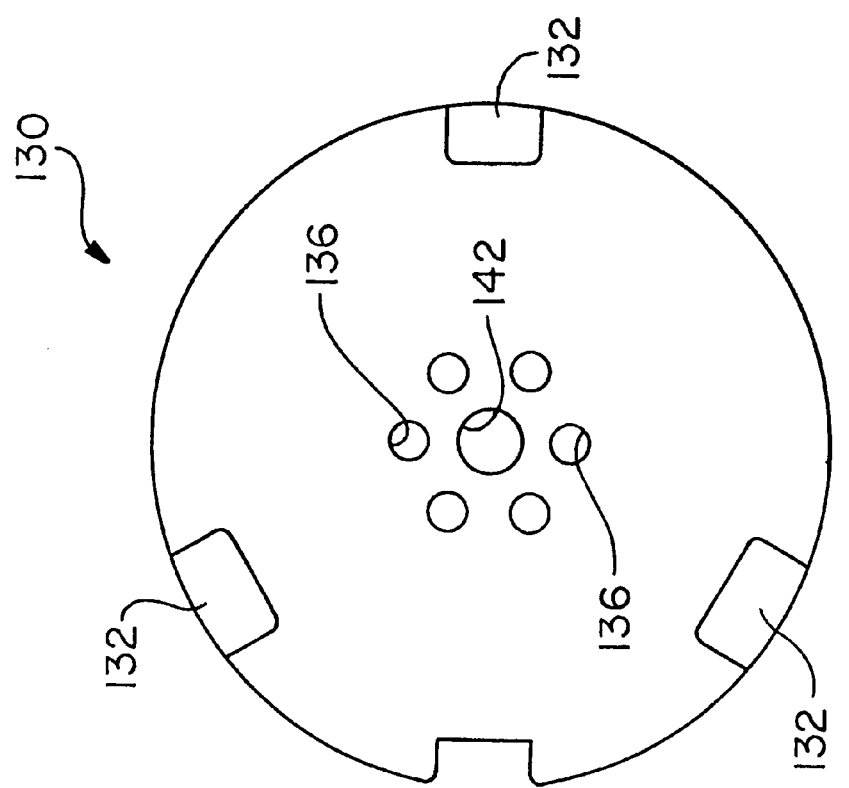
FIG. 12 is a bottom view showing a second major surface of the coupler of FIG. 10 in accordance with certain principles of the invention.

A coupler 130, also shown in FIGS. 10, 11 and 12, is positioned above the movable disk 118 and is formed with a plurality of lugs 132 (one shown) which nest into a corresponding plurality of notches 134 (one shown) for transmitting motion from the coupler to the movable disk in the same manner as described above. A plurality of holes 136 are formed through the coupler and communicate with the opening 126 of the movable disk 118. A circular ridge 138 is formed in the movable disk 118 and is contiguous with the opening 126 thereof. An O-ring 140 is captured between the ridge 138 and the underside of the coupler 130 to provide a water tight seal between the opening 126 and the adjacent portion of the underside of the coupler.

A hole 142 is formed through a central portion of the coupler 130 for supporting a flexible valve 144 such as, for example, an umbrella valve which is composed of a resilient material such as, for example, rubber. In this context, the coupler 130 functions as a valve holder for supporting the flexible valve 144 within the cartridge valve 116. As shown in FIGS. 5, 6, 7, 15 and 16, the flexible valve 144 is formed integrally with a saucer 146, a central hub 148, a stem 150 and an enlarged head 152. The saucer 146 terminates in a circular rim 154 and the saucer 146 is formed with an inner surface 156 and an outer surface 158. The saucer 144 is generally formed in a parabolic shape with the inner surface 156 being concave and the outer surface 158 being convex.

Referring again to FIG. 5, the stem 150 is located in the hole 142 of the coupler 130, the head 152 is above the hole and the saucer 146 and the hub 148 are located within the opening 126 of the movable disk 118. Also, the underside of the hub 148 is spaced above the opening 124 of the movable disk 118. During a period when water is flowing through the cartridge valve 116 under normal water pressure conditions, the water passes through the opening 142 of the movable disk 118 and into the opening 126 thereof. Also during this period, the saucer 146 of the flexible valve 144 is in its normal state as shown in FIG. 5 wherein the water passing through the cartridge valve 116 is in contact with the outer surface 158 of the flexible valve to press the rim 154 firmly against the adjacent underside of the coupler 130. In this position, the flexible valve 144 forms a tight seal to prevent communication between the opening 126 of the movable disk 118 and the holes 136 of the coupler 130.

Air, which exists in the environment about the exterior of the cartridge valve 116, enters the valve through the opening 72 and occupies the internally open portions of the valve represented by the stippled areas shown in FIGS. 5, 6, 7 and 8. During operation of the cartridge valve 116 under normal water pressure conditions, the water pressure level exceeds the pressure level of the air present at the inner surface 154 of the saucer 146 of the flexible valve 144. Under this condition, the saucer 146 assumes the position as illustrated to seal the holes 136 and thereby preclude the passage of water therein.

If the pressure of the water being supplied through the cartridge valve 116 drops as noted above, thereby developing a negative pressure, the pressure of the air adjacent the inner surface 158 of the flexible valve 144 is now greater than the water pressure. With this pressure differential, the saucer 146 is forced away from sealing engagement with the underside of the coupler 130. The air can now enter the passage of the movable disk 118 formed by the openings 114, 122 and 126, and into the inlet conduits, to negate the effects of the negative pressure. If the spray head 44 (FIG. 1) had been in the dirty water as described above, the dirty water would not have been siphoned into the spray head and the potable water supply.

Referring to FIG. 6, a cartridge valve 160 forms a second embodiment of a cartridge valve with an integral vacuum breaker. In this second embodiment, a circular groove 162 is formed in the surface 128 of the movable disk 118 for receipt of the O-ring 140 which is captured between the movable disk and a coupler 164 to form a seal in the manner described above. A plurality of holes 166 are formed in the side of the housing 66 to provide an additional passage to allow the environmental air to enter the housing. The coupler 164 is formed with a thinner profile than the coupler 130 (FIG. 5) to provide an open passage for the air which is entering through the holes 166 as well as the air which is entering through the opening 72. The cartridge valve 160 performs in the same manner as the cartridge valve 116 with respect to the response to the development of a negative pressure in the water being supplied through the valve 160.

Figure 9:
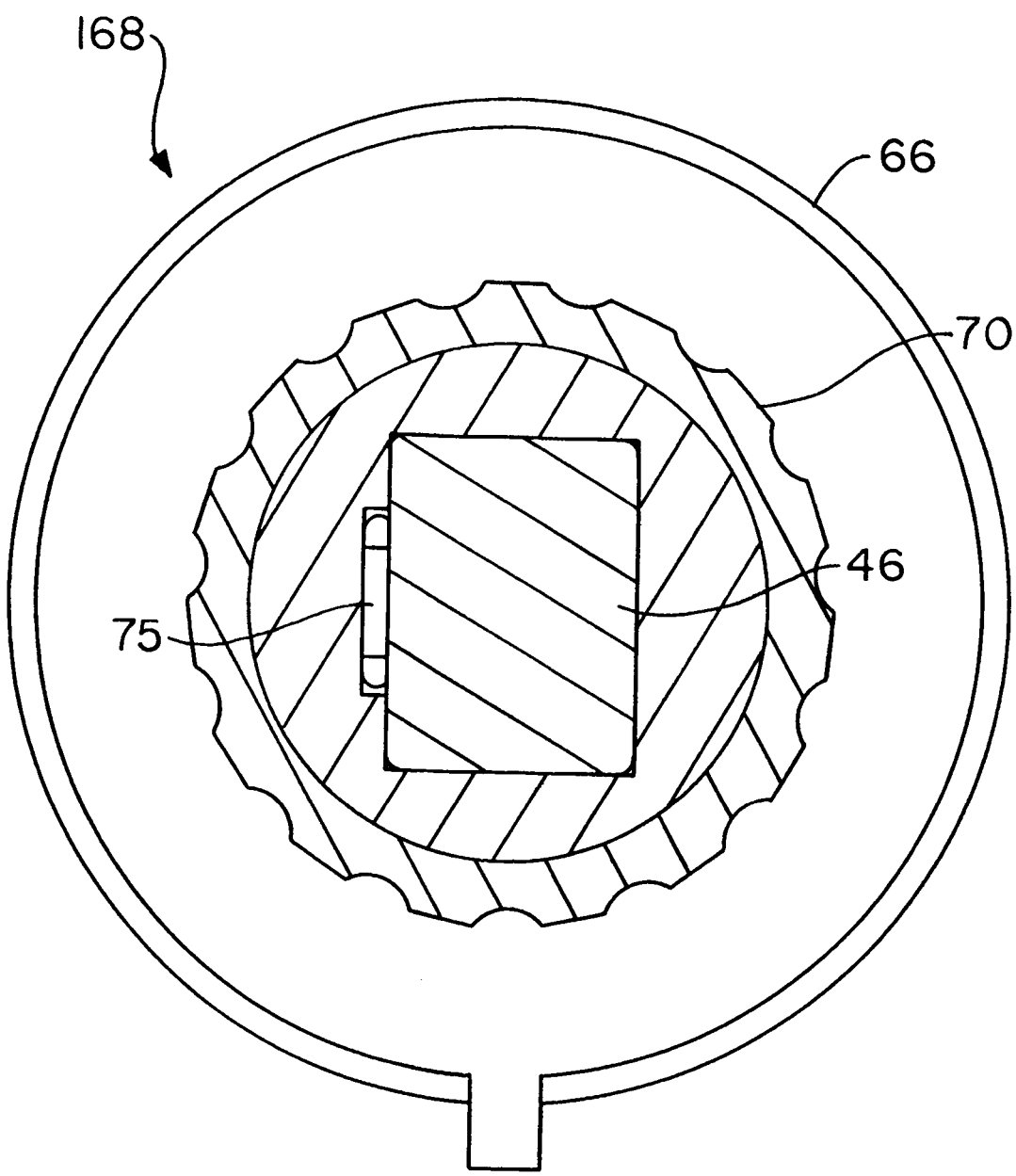
FIG. 9 is a sectional view showing a portion of the cartridge valve of FIG. 7 in accordance with certain principles of the invention.

As shown in FIG. 7, a cartridge valve 168 forms a third embodiment of a cartridge valve with an integral vacuum breaker, which is the preferred embodiment. The cartridge valve 168 differs from the cartridge valve 160 (FIG. 6) in that the size of the major opening 72 has been reduced, as shown in FIGS. 7 and 9, to the extent that essentially all of the environmental air within the housing 66 enters through the holes 166. The cartridge valve 168 performs in the same manner as cartridge valves 116 and 160 with respect to the response to the development of a negative pressure in the water being supplied through the valve 168. A lubricating packing material may be placed in a space 170 within the opening 72 to further seal the opening from the air in the environment surrounding the cartridge valve 168.

Thus, the three embodiments of cartridge valves 116, 160 and 168, each with an integral vacuum breaker, provide the many the continued long-wearing and functional advantages of using a ceramic valve while also providing the antisiphoning feature without sacrificing the compactness and space advantages attributable to a ceramic valve.

In general, the above-identified embodiments are not to be construed as limiting the breadth of the present invention. Modifications, and other alternative constructions, will be apparent which are within the spirit and scope of the invention as defined in the appended claims.

What is claimed is:

1. A cartridge valve with a vacuum breaker, which comprises a housing;

a first disk mounted fixedly within the housing formed with a first surface and formed with an opening therethrough;

a second disk mounted for movement within the housing and formed with a second surface on one side thereof in interfacing engagement with the first surface, and a third surface formed on a side thereof opposite the one side;

the second disk being formed with a passage therethrough which is positionable in communication with the opening formed through the first disk upon selective movement of the second disk;

a valve holder positioned adjacent the third surface of the second disk and having at least one hole formed therethrough for communication with the passage of the second disk;

a pressure-responsive valve having a stationary portion attached to the valve holder to preclude movement of the stationary portion of the pressure-responsive valve relative to the valve holder; and the pressure-responsive valve having a flexible portion for blocking communication between the hole of the valve holder and the passage of the second disk when the pressure of a medium in the passage is greater than the pressure of a medium in the hole and for allowing communication therebetween when the pressure in the passage is less than the pressure in the hole.

2. The cartridge valve as set forth in claim 1, wherein the first and second disks are composed of a hard material.

3. The cartridge valve as set forth in claim 2, wherein the hard material is ceramic.

4. The cartridge valve as set forth in claim 1, wherein the pressure responsive valve comprises:

a saucer having a concave interior surface;

a hub extending centrally from the interior surface of the saucer;

a stem extending from the hub; and an enlarged head extending from the stem.

5. The cartridge valve as set forth in claim 1, wherein the pressure responsive valve comprises:

a hub;

a stem extending from the hub; and an enlarged head extending from the stem.

6. The cartridge valve as set forth in claim 5, wherein the valve holder is formed with a second hole therethrough with the stem being located within the second hole, the head located outside and at one end of the second hole and the hub located outside and at another end of the second hole opposite the one end.

7. The cartridge valve as set forth in claim 1, which further comprises a major opening formed in the cartridge valve such that an environment outside of the cartridge valve is in communication, through the major opening, with the opening formed through the valve holder.

8. The cartridge valve as set forth in claim 1, wherein the housing is formed with at least one hole in a side wall thereof which is in communication with the hole formed in the valve holder.

9. The cartridge valve as set forth in claim 1, wherein the housing is generally cylindrical about a central axis thereof, and the housing comprises at least one hole formed therethrough which is generally perpendicular to the central axis thereof.

10. The cartridge valve as set forth in claim 1, wherein the one hole formed in the valve holder is a first hole and a second hole is formed therethrough with the stationary portion of the pressure responsive valve being located in the second hole.

11. The cartridge valve as set forth in claim 1, wherein the flexible portion of the pressure-responsive valve is formed with a rim which surrounds and seals the hole formed in the valve holder to block communication between the sealed hole and the passage of the second disk.

12. The cartridge valve as set forth in claim 1, wherein the valve holder is a coupler which is attached to the second disk to move the second disk upon selective movement of the coupler.

\* \* \* \* \*